United States Patent
Park et al.

(10) Patent No.: US 11,776,753 B2
(45) Date of Patent: *Oct. 3, 2023

(54) MULTILAYER ELECTRONIC COMPONENT AND BOARD HAVING THE SAME MOUNTED THEREON

(71) Applicant: SAMSUNG ELECTRO-MECHANICS CO., LTD., Suwon-si (KR)

(72) Inventors: Heung Kil Park, Suwon-si (KR); Se Hun Park, Suwon-si (KR); Hun Gyu Park, Suwon-si (KR); Woo Chul Shin, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/955,079

(22) Filed: Sep. 28, 2022

(65) Prior Publication Data

US 2023/0013554 A1 Jan. 19, 2023

Related U.S. Application Data

(62) Division of application No. 16/776,622, filed on Jan. 30, 2020, now Pat. No. 11,488,778.

(30) Foreign Application Priority Data

Jul. 17, 2019 (KR) .................. 10-2019-0086596

(51) Int. Cl.
*H01G 4/232* (2006.01)
*H01G 4/005* (2006.01)
*H01G 2/06* (2006.01)

(52) U.S. Cl.
CPC ............ *H01G 4/232* (2013.01); *H01G 2/065* (2013.01); *H01G 4/005* (2013.01)

(58) Field of Classification Search
CPC ......... H01G 2/065; H01G 4/005; H01G 4/232
See application file for complete search history.

(56) References Cited

U.S. PATENT DOCUMENTS 10,062,511 B1  8/2018  Park et al.
10,325,722 B2  6/2019  Park et al.
(Continued)

FOREIGN PATENT DOCUMENTS

CN       109599267 A    4/2019
JP       2012-204572 A  10/2012
(Continued)

OTHER PUBLICATIONS

Chinese Office Action dated Sep. 2, 2022 issued in Chinese Patent Application No. 202010272528.X (with English translation).
(Continued)

*Primary Examiner* — Nathan Milakovich
(74) *Attorney, Agent, or Firm* — Morgan, Lewis & Bockius LLP

(57) ABSTRACT

A multilayer electronic component includes a multilayer capacitor including a capacitor body and a plurality of external electrodes spaced apart from each other on a mounting surface of the capacitor body, and a connection terminal including a plurality of land portions disposed on the plurality of external electrodes, respectively. When a thickness of the multilayer capacitor is defined as T1 and a distance from an uppermost end of the plurality of external electrodes to a bottom of the connection terminal is defined as T2, T1/T2 is 0.6 to 0.9.

19 Claims, 10 Drawing Sheets

(56) References Cited

U.S. PATENT DOCUMENTS

| | | | |
|---|---|---|---|
| 10,325,723 B1 | 6/2019 | Kim et al. | |
| 10,553,362 B1 | 2/2020 | Sim et al. | |
| 11,488,778 B2 * | 11/2022 | Park | H01G 2/065 |
| 2014/0284089 A1 | 9/2014 | Hattori et al. | |
| 2015/0270066 A1 | 9/2015 | Hattori et al. | |
| 2016/0007446 A1 | 1/2016 | Ishikawa et al. | |
| 2016/0093439 A1 | 3/2016 | Fujita et al. | |
| 2018/0323010 A1 | 11/2018 | Park et al. | |
| 2019/0103223 A1 | 4/2019 | Park et al. | |
| 2022/0165493 A1 | 5/2022 | Kim et al. | |

FOREIGN PATENT DOCUMENTS

| | | |
|---|---|---|
| JP | 2018-190952 A | 11/2018 |
| KR | 10-2017-0028610 A | 3/2017 |
| KR | 10-2015-0127965 A | 11/2018 |
| KR | 10-2018-0134264 A | 12/2018 |

OTHER PUBLICATIONS

Notice of Allowance issued in corresponding U.S. Appl. No. 16/776,622 dated Jun. 30, 2022.
Office Action issued in corresponding U.S. Appl. No. 16/776,622 dated Mar. 2, 2022.

* cited by examiner

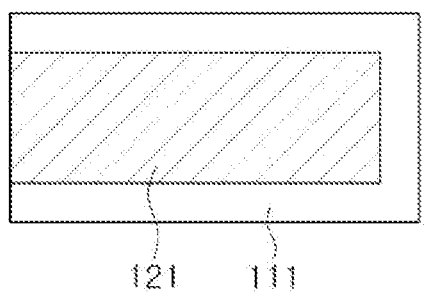
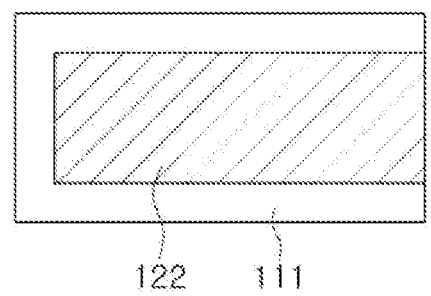
FIG. 3A
FIG. 3B

MULTILAYER ELECTRONIC COMPONENT AND BOARD HAVING THE SAME MOUNTED THEREON

CROSS-REFERENCE TO RELATED APPLICATION(S)

This application is the divisional application of U.S. patent application Ser. No. 16/776,622 filed on Jan. 30, 2020, which claims benefit of priority to Korean Patent Application No. 10-2019-0086596 filed on Jul. 17, 2019 in the Korean Intellectual Property Office, the disclosures of which are incorporated herein by reference in their entirety.

TECHNICAL FIELD

The present disclosure relates to a multilayer electronic component and a board having the same mounted thereon.

BACKGROUND

As a type of multilayer electronic component, a multilayer capacitor is formed of a dielectric material, and the dielectric material is piezoelectric, and may thus be modified in synchronization with an applied voltage.

When a frequency of the applied voltage is in the audible frequency band, a displacement of a capacitor body becomes vibrations and is transmitted to a substrate through a solder, and the vibration of the substrate may be audible. This sound is known as acoustic noise.

Such acoustic noise may be perceived as a malfunction of the device by the user as an abnormal sound when the operating environment of the device is quiet.

In addition, in a device having a voice circuit, the acoustic noise may be superimposed on the voice output to reduce the quality of the device.

In addition, apart from acoustic noise perceived by the human ear, when the piezoelectric vibrations of the multilayer capacitor are generated in a high frequency region of 20 kHz or more, they may cause malfunctioning of various sensors used in IT and industrial/electric fields.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a multilayer electronic component in which acoustic noise in an audible frequency region of less than 20 kHz and high frequency vibrations of 20 kHz or more may be reduced, and a board having the same mounted thereon.

According to an aspect of the present disclosure, a multilayer electronic component includes a multilayer capacitor including a capacitor body and a plurality of external electrodes spaced apart from each other on a mounting surface of the capacitor body; and a connection terminal including a plurality of land portions disposed on the plurality of external electrodes, respectively. When a thickness of the multilayer capacitor is defined as T1 and a distance from an uppermost end of the plurality of external electrodes to a bottom of the connection terminal is defined as T2, T1/T2 is 0.6 to 0.9.

The capacitor body may have a first surface which is a mounting surface, and a second surface opposing the first surface, and third and fourth surfaces connected to the first and second surfaces and opposing each other, and fifth and sixth surfaces connected to the first and second surfaces and connected to the third and fourth surfaces, the fifth and sixth surfaces opposing each other, and may include a first internal electrode and a second internal electrode, one ends of the first and second internal electrodes being alternately exposed through the third and fourth surfaces. The plurality of external electrodes may include a first external electrode and a second external electrode, the first and second external electrodes including first and second band portions disposed on the first surface to be spaced apart from each other and first and second connection portions extending from the first and second band portions onto the third and fourth surfaces, respectively, and connected to the first and second internal electrodes, respectively. The plurality of land portions may include first and second land portions, disposed on the first and second band portions, respectively, the first and second land portions being provided with first and second cutouts provided in two surfaces of the first and second land portions, facing each other in a direction connecting the third and fourth surfaces, respectively.

The first and second internal electrodes may be alternately stacked in a direction connecting the first and second surfaces of the capacitor body.

The first and second internal electrodes may be alternately stacked in a direction connecting the fifth and sixth surfaces of the capacitor body.

The first and second band portions may be provided with first and second solder accommodating portions that are provided on lower sides of the first and second band portions by the first and second cutouts, respectively.

The plurality of land portions may be comprised of a conductor.

The plurality of land portions may be made of an insulator, and are provided with a conductor layer provided on a surface thereof, respectively.

The connection terminal may be an interposer.

The connection terminal may further include a bridge portion disposed between land portions and made of a non-conductive material.

The land portions and the bridge portion may be integrated with each other.

Each of the land portions may be comprised of a conductor, and the bridge portion and the land portions may be separated from each other.

The land portion and the bridge portion may be made of alumina.

The plurality of land portions may include first and second discrete land portions spaced apart from each other.

The first and second land portions may respectively have first and second end surfaces facing each other in a direction connecting the first and second land portions.

The multilayer electronic component may further include conductive adhesives disposed between the plurality of land portions and the plurality of external electrodes, respectively.

According to an aspect of the present disclosure, a board having a multilayer electronic component mounted thereon includes a substrate on which a plurality of electrode pads are provided on one surface, and the multilayer electronic component described above, mounted in such a manner that the plurality of land portions are mounted on the plurality of electrode pads to be connected to the plurality of electrode pads, in a one to one manner.

BRIEF DESCRIPTION OF DRAWINGS

The above and other aspects, features, and advantages of the present disclosure will be more clearly understood from the following detailed description, taken in conjunction with the accompanying drawings, in which:

FIGS. 3A and 3B are plan views illustrating first and second internal electrodes of a multilayer electronic component according to an embodiment of the present disclosure;

DETAILED DESCRIPTION

Figure 1:
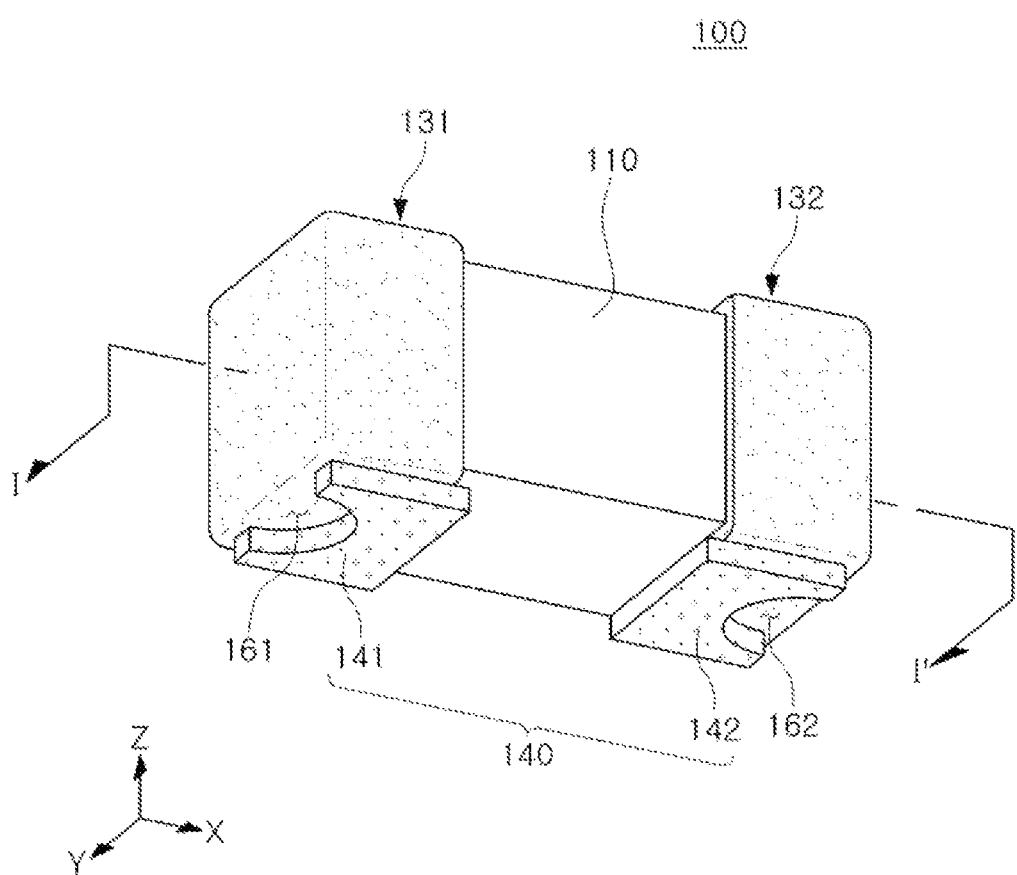
FIG. 1 is a perspective view illustrating a multilayer electronic component according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

Subsequently, examples are described in further detail with reference to the accompanying drawings.

Figure 2:
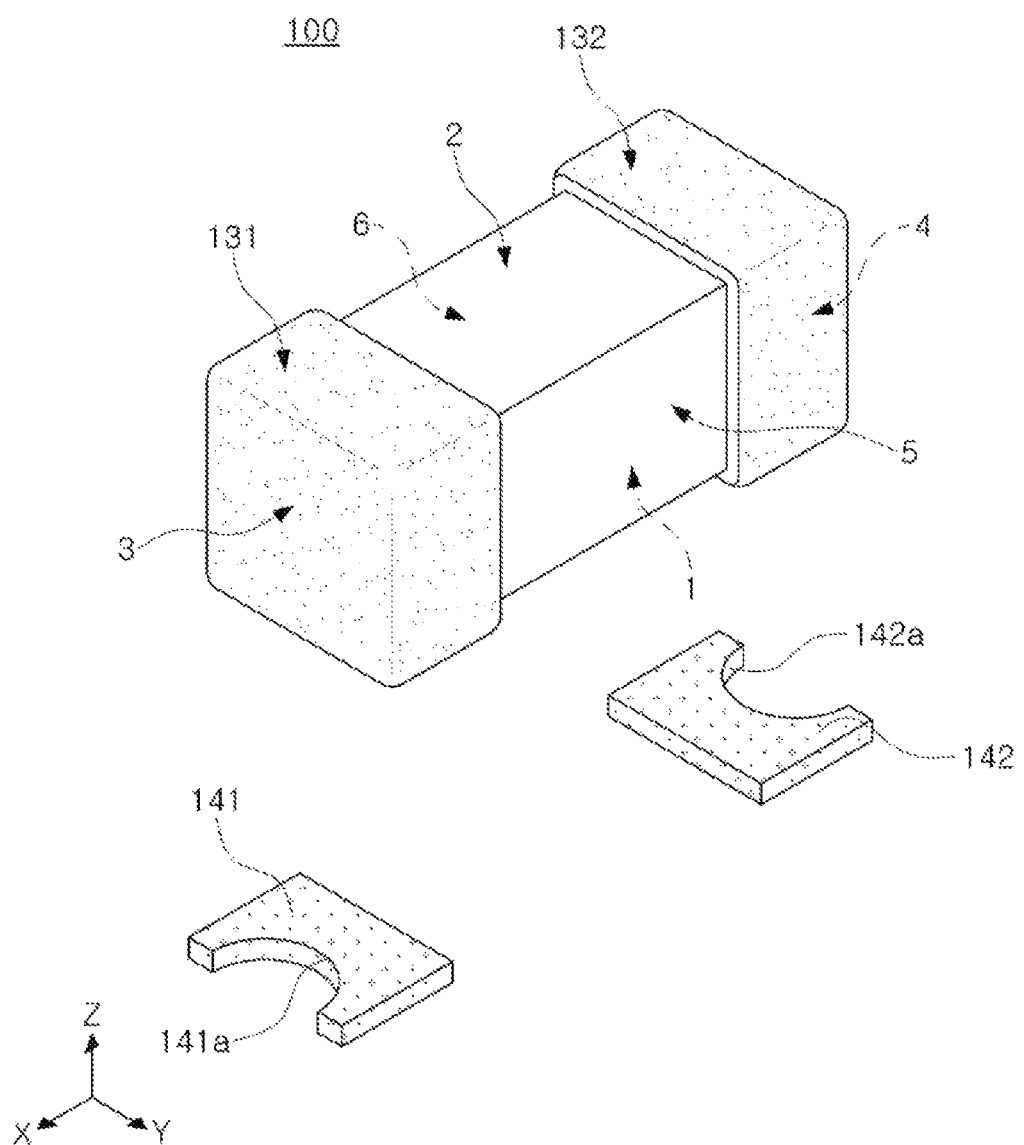
FIG. 2 is an exploded perspective view illustrating a connection terminal separated from FIG. 1.
Figure 4:
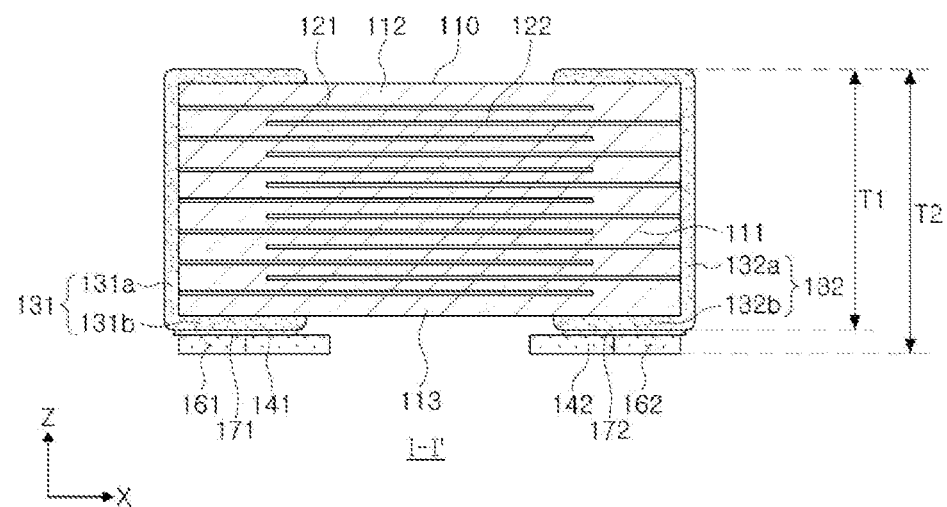
FIG. 4 is a cross-sectional view taken along line I-I' of FIG. 1.

FIG. 1 is a perspective view illustrating a multilayer electronic component according to an embodiment, FIG. 2 is an exploded perspective view of a connection terminal separated from FIG. 1, FIGS. 3A and 3B are plan views illustrating first and second internal electrodes of a multilayer electronic component according to an embodiment, respectively, and FIG. 4 is a cross-sectional view taken along line I-I' of FIG. 1.

Referring to FIGS. 1 to 4, a multilayer electronic component 100 according to an embodiment may include a multilayer capacitor, which includes a capacitor body 110 and a plurality of external electrodes spaced apart from each other on a mounting surface of the capacitor body 110, and a connection terminal 140 including a plurality of land portions disposed on the external electrodes, respectively.

When a thickness of the multilayer capacitor is defined as T1 and a distance from the top of the plurality of external electrodes to the bottom of the connection terminal is defined as T2, T1/T2 may be 0.6 to 0.9.

Hereinafter, when defining the direction of the capacitor body 110 to clearly describe the embodiment of the present disclosure, X, Y and Z illustrated in the drawings indicate the length direction, width direction and thickness direction of the capacitor body 110, respectively. In addition, in this embodiment, the Z direction may be used with the same concept as a stacking direction in which dielectric layers are stacked.

The capacitor body 110 is obtained by stacking a plurality of dielectric layers 111 in the Z direction, followed by firing, and may include the plurality of dielectric layers and a plurality of first and second internal electrodes which are alternately disposed in the Z direction, to have the dielectric layer 111 interposed therebetween.

Covers 112 and 113 having a predetermined thickness may be further formed on both sides of the capacitor body 110 in the Z direction of the capacitor body 110, respectively.

In this case, the dielectric layers 111 adjacent to each other in the capacitor body 110 may be integrated such that a boundary therebetween may not be distinct from each other.

The capacitor body 110 may have a substantially hexahedral shape, but an embodiment thereof is not limited thereto.

In this embodiment, for convenience of description, two surfaces of the capacitor body 110 opposing each other in the Z direction are defined as first and second surfaces 1 and 2, two surfaces of the capacitor body 110 connected to the first and second surfaces 1 and 2 and opposing each other in the X direction are defined as third and fourth surfaces 3 and 4, and two surfaces of the capacitor body 110 connected to the first and second surfaces 1 and 2 and connected to the third and fourth surfaces 3 and 4 and opposing each other in the Y direction are defined as fifth and sixth surfaces 5 and 6. In this embodiment, the first surface 1 may be a mounting surface.

In addition, the dielectric layer 111 may include a ceramic material having a high dielectric constant, and may include, for example, $BaTiO_3$-based ceramic powder, but an embodiment thereof is not limited thereto.

As the $BaTiO_3$-based ceramic powder, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$ or the like, in which calcium (Ca), zirconium (Zr) or the like is partially solution solidified in $BaTiO_3$, may be used, but an embodiment thereof is not limited thereto.

In addition, a ceramic additive, an organic solvent, a plasticizer, a binder, a dispersant, and the like may be further added to the dielectric layer 111.

As the ceramic additive, for example, transition metal oxide or transition metal carbide, rare earth element, magnesium (Mg), aluminum (Al) or the like may be used.

The first and second internal electrodes 121 and 122 are electrodes having different polarities, and are alternately disposed to face each other in the Z direction, with the dielectric layer 111 interposed therebetween, and one ends of the first and second internal electrodes 121 and 122 may be exposed through the third and fourth surfaces 3 and 4 of the capacitor body 110, respectively.

In this case, the first and second internal electrodes 121 and 122 may be electrically insulated from each other by the dielectric layer 111 disposed therebetween.

End portions of the first and second internal electrodes 121 and 122 alternately exposed through the third and fourth surfaces 3 and 4 of the capacitor body 110 may be connected to first and second connection portions 131a and 132a of the first and second external electrodes 131 and 132 to be electrically connected to each other, respectively. The first and second connection portions 131a and 132a may be disposed on the third and fourth surfaces 3 and 4 of the capacitor body 110, respectively.

In this case, the first and second internal electrodes 121 and 122 may be formed of a conductive metal, for example, a material such as nickel (Ni) or a nickel (Ni) alloy, but an embodiment thereof is not limited thereto.

According to the above configuration, when a predetermined voltage is applied to the first and second external electrodes 131 and 132, charges are accumulated between the first and second internal electrodes 121 and 122 facing each other.

In this case, capacitance of the multilayer electronic component 100 may be proportional to overlapping areas of the first and second internal electrodes 121 and 122 overlapping each other in the Z direction.

In this embodiment, the plurality of external electrodes may include first and second external electrodes 131 and 132.

The first and second external electrodes 131 and 132 are disposed to be spaced apart from each other in the X direction on the first surface 1, which is a mounting surface of the capacitor body 110, and voltages having different polarities are provided to the first and second external electrodes 131 and 132. The first and second external electrodes 131 and 132 may be electrically connected to the exposed portions of the first and second internal electrodes 121 and 122, respectively.

Plating layers may be formed on surfaces of the first and second external electrodes 131 and 132 as required.

For example, the first and second external electrodes 131 and 132 may each include a conductive layer, a nickel (Ni) plating layer formed on the conductive layer, and a tin (Sn) plating layer formed on the nickel plating layer.

The first external electrode 131 may include the first connection portion 131a and a first band portion 131b.

The first band portion 131b is disposed on a portion of the first surface 1 of the capacitor body 110, and is a portion to which a first land portion of the connection terminal to be described later is connected and electrically connected.

The first connection portion 131a extends from the first band portion 131b to the third surface 3 of the capacitor body 110 and is connected to the first internal electrode 121 exposed through the third surface 3 of the capacitor body 110.

In this case, the first band portion 131b may further extend to a portion of the second surface 2 of the capacitor body 110 and portions of the fifth and sixth surfaces 5 and 6 of the capacitor body 110 when necessary for improving fixing strength.

The second external electrode 132 may include the second connection portion 132a and a second band portion 132b.

The second band portion 132b is disposed to be spaced apart from the first band portion 131b in the X direction, on the first surface 1 of the capacitor body 110, and is electrically connected to a second land portion of the connection terminal to be described later.

The second connection portion 132a extends from the second band portion 132b to the fourth surface 4 of the capacitor body 110 and is connected to the second internal electrode 122 exposed through the fourth surface 4 of the capacitor body 110.

In this case, the second band portion 132b may further extend to a portion of the second surface 2 of the capacitor body 110 and portions of the fifth and sixth surfaces 5 and 6 of the capacitor body 110, as required, to improve fixing strength.

The connection terminal 140 includes first and second land portions 141 and 142 spaced apart from each other in the X direction.

The first and second land portions 141 and 142 may be disposed on the first band portion 131b of the first external electrode 131 and the second band portion 132b of the second external electrode 132, respectively.

In this case, the first band portion 131b and the first land portion 141, and the second band portion 132b and the second land portion 142 may be bonded to each other, respectively, using conductive adhesives 171 and 172 such as high melting point solder or conductive paste.

The first land portion 141 may be formed of an insulator as a non-conductive material, and may be formed of, for example, an insulating substrate or a circuit board such as a FR4 substrate, F-PCB or the like, but a material thereof is not limited thereto.

A conductor layer formed of a conductive metal may be formed on a surface of the first land portion 141. The conductor layer may be formed of a plating layer.

In addition, a first cutout 141a may be formed in the first land portion 141. The first cutout 141a may be formed in a portion of a circumferential surface connecting two opposite surfaces of the first land portion 141 in the Z direction.

Accordingly, a first solder accommodating portion 161 as a solder pocket may be provided below the first band portion 131b of the first external electrode 131 on the first surface 1 side of the capacitor body 110.

In this embodiment, the first cutout 141a may be formed to be open in a direction toward the third surface 3 of the capacitor body 110 in the X direction.

In this case, the first cutout 141a may be formed to have a curved surface, but an embodiment thereof is not limited thereto.

The second land portion 142 may be formed of an insulator as a non-conductive material, and may be formed of, for example, an insulating substrate or a circuit board such as a FR4 substrate, F-PCB or the like, but an embodiment thereof is not limited thereto.

A conductor layer formed of a conductive metal may be formed on the surface of the second land portion 142. The conductor layer may be formed of a plating layer.

A second cutout 142a may be formed in the second land portion 142. The second cutout 142a may be formed in a portion of a circumferential surface connecting two opposite surfaces of the second land portion 142 in the Z direction.

Accordingly, a second solder accommodating portion 162 as a solder pocket may be provided below the second band portion 132b of the second external electrode 132 on the first surface 1 side of the capacitor body 110.

In this embodiment, the second cutout 142a may be formed to be open in a direction toward the fourth surface 4 of the capacitor body 110 in the X direction.

In this case, the second cutout 142a and the first cutout 141a may be toward opposite directions to each other, in the X direction.

The second cutout 142a may be formed to have a curved surface, but an embodiment thereof is not limited thereto.

As in this embodiment, when the conductor layer is formed on overall circumferential surfaces of the first and second land portions 141 and 142, soldering is formed on the entire circumferential surfaces of the first and second land portions 141 and 142, including inner sides of the first and second cutouts 141a and 142a, to reduce deviation of a position between the multilayer capacitor and the substrate when the multilayer capacitor is mounted on the substrate.

In addition, at the time of soldering, the area of bonding between the land portion and solder is increased to improve fixing strength of the multilayer capacitor.

The first and second land portions 141 and 142 of the connection terminal 140 separate the substrate and the capacitor body 110 from each other by a predetermined distance, such that piezoelectric vibrations generated in the capacitor body 110 introduced into the substrate may be reduced.

In the case of the connection terminal 140 according to this embodiment, the first and second land portions 141 and 142 may be formed of a conductor.

When the first and second land portions 141 and 142 are formed of a conductor, there is no need to form a separate conductor layer on the first and second land portions 141 and 142.

In the multilayer electronic component 100 according to this embodiment, when a thickness of the multilayer capacitor is defined as $T1$, and a distance from the top of the first or second external electrode 131 or 132 to the bottom of the connection terminal 140 is defined as $T2$, $T1/T2$ may be 0.6 to 0.9.

A conductive paste for bonding the external electrode and the connection terminal in the relation of $T1/T2$ may have a thickness of, in detail, 0.1 mm or less, where $T1$ is a thickness of only a multilayer capacitor, and $T2$ is an overall thickness of an electronic component including a conductive paste. For example, $T2$ may be a sum of $T1$, a thickness of the first land portion 141 or the second land portion 142, and a thickness of the conductive paste disposed between the multilayer capacitor and the first land portion 141 or the second land portion 142 on which the conductive paste is disposed.

In a case in which the thickness of the multilayer capacitor is formed to be relatively thick, if $T1/T2$ is less than 0.6, a thickness of the connection terminal 140 becomes too thick, causing the connection terminal itself to vibrate by shaking, thereby vibrating a solder fillet.

As a result, since the connection terminal 140 causes occurrence of acoustic noise, the connection terminal 140 may not serve as a noise reduction structure.

On the contrary, in a case in which the thickness of the multilayer capacitor is formed to be relatively thin, if $T1/T2$ is less than 0.6, a maximum displacement amount generation portion of the multilayer capacitor and the solder fillet are easily in contact with each other even in a case in which the solder fillet is low. Thus, maximum displacement is transferred to the substrate, and acoustic noise increases.

If $T1/T2$ exceeds 0.9, the connection terminal 140 is formed to have relatively too thin thickness, and formation of the solder fillet to the head surfaces of a multilayer capacitor may not be appropriately suppressed.

Accordingly, vibrations transferred from the multilayer capacitor to the substrate increase, and as a result, the connection terminal 140 may not serve as a noise reduction structure.

Therefore, by limiting the range of T1/T2 to 0.6 to 0.9, an acoustic noise reduction effect of the multilayer electronic component 100 in this embodiment may be obtained.

In addition, T2 may be, in detail, 0.7 mm or less.

The multilayer capacitor may have, for example, a length of 0.8 mm and a width of 0.4 mm.

Figure 5A:
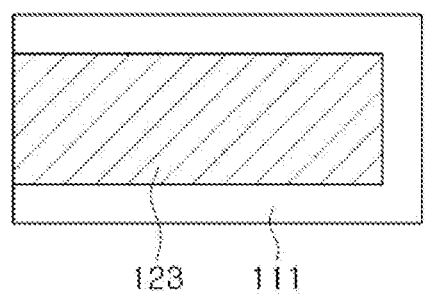
FIGS. 5A and 5B are plan views illustrating first and second internal electrodes of a multilayer electronic component according to another embodiment of the present disclosure, respectively.
Figure 5B:
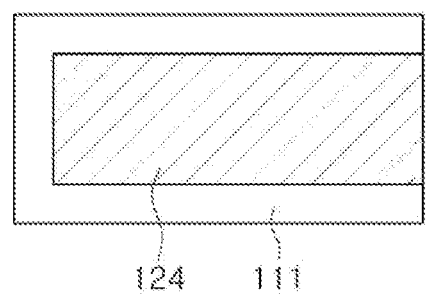
Figure 6:
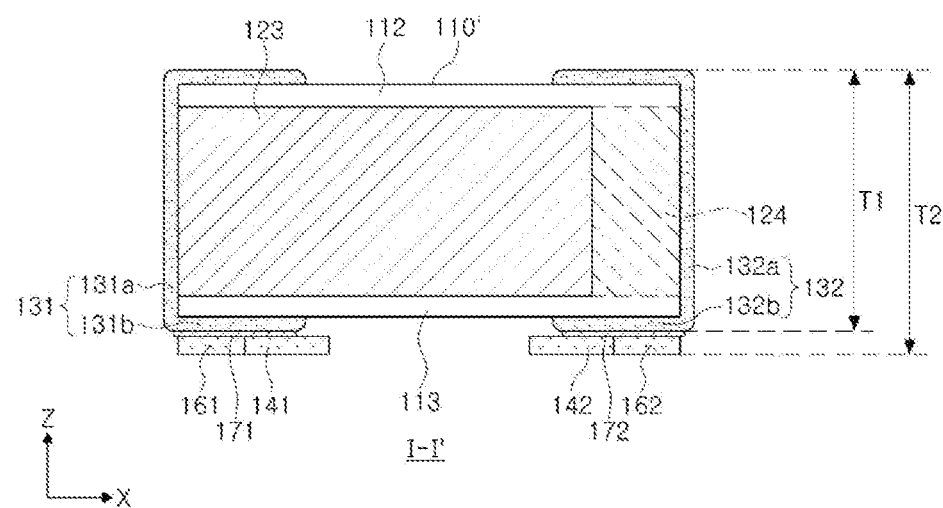
FIG. 6 is a cross-sectional view illustrating a multilayer electronic component according to another embodiment of the present disclosure, taken along line I-I' of FIG. 1.

FIGS. 5A and 5B are plan views illustrating first and second internal electrodes of a multilayer electronic component according to another embodiment, and FIG. 6 is a cross-sectional view of a multilayer electronic component according to another embodiment, taken along line II-II' of FIG. 1.

In this case, details similar to those in the above-described embodiment are omitted to avoid duplication.

As illustrated in FIGS. 5A to 6, according to another embodiment, first and second internal electrodes 123 and 124 may be alternately stacked in a Y direction connecting the fifth and sixth surface of a capacitor body 110', with a dielectric layer 111 interposed therebetween.

Figure 7:
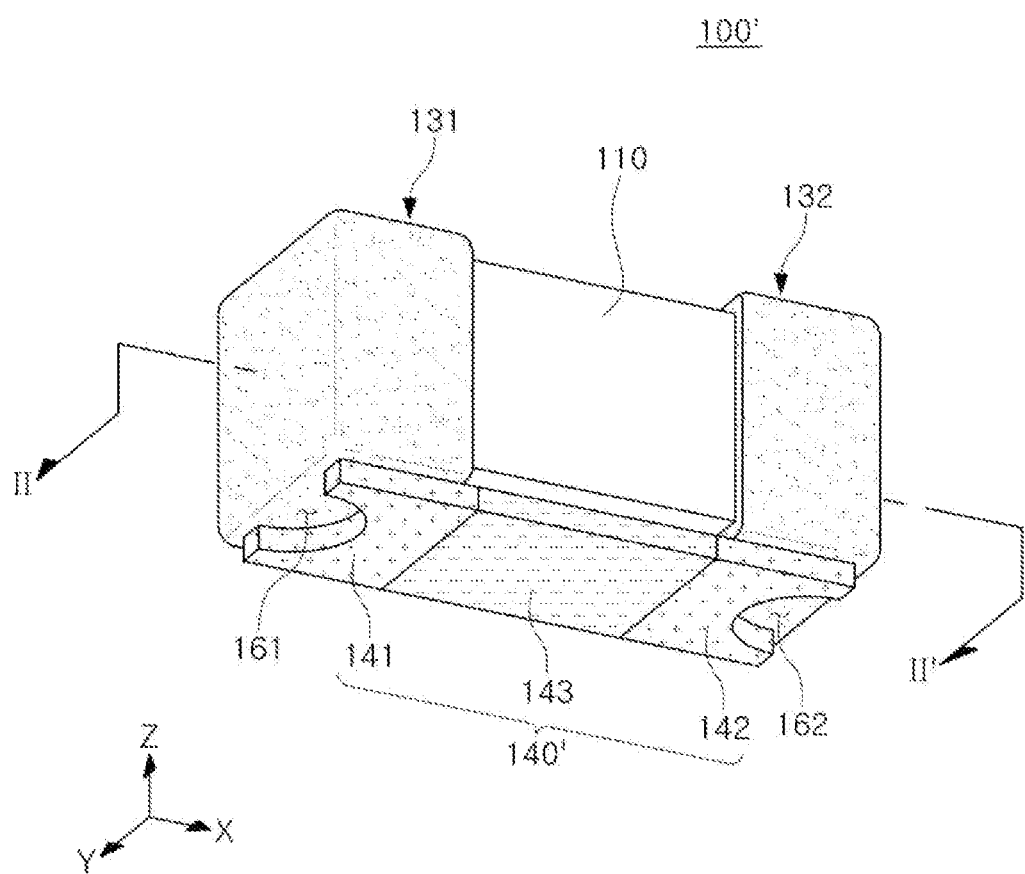
FIG. 7 is a perspective view illustrating a multilayer electronic component according to another embodiment of the present disclosure.
Figure 8:
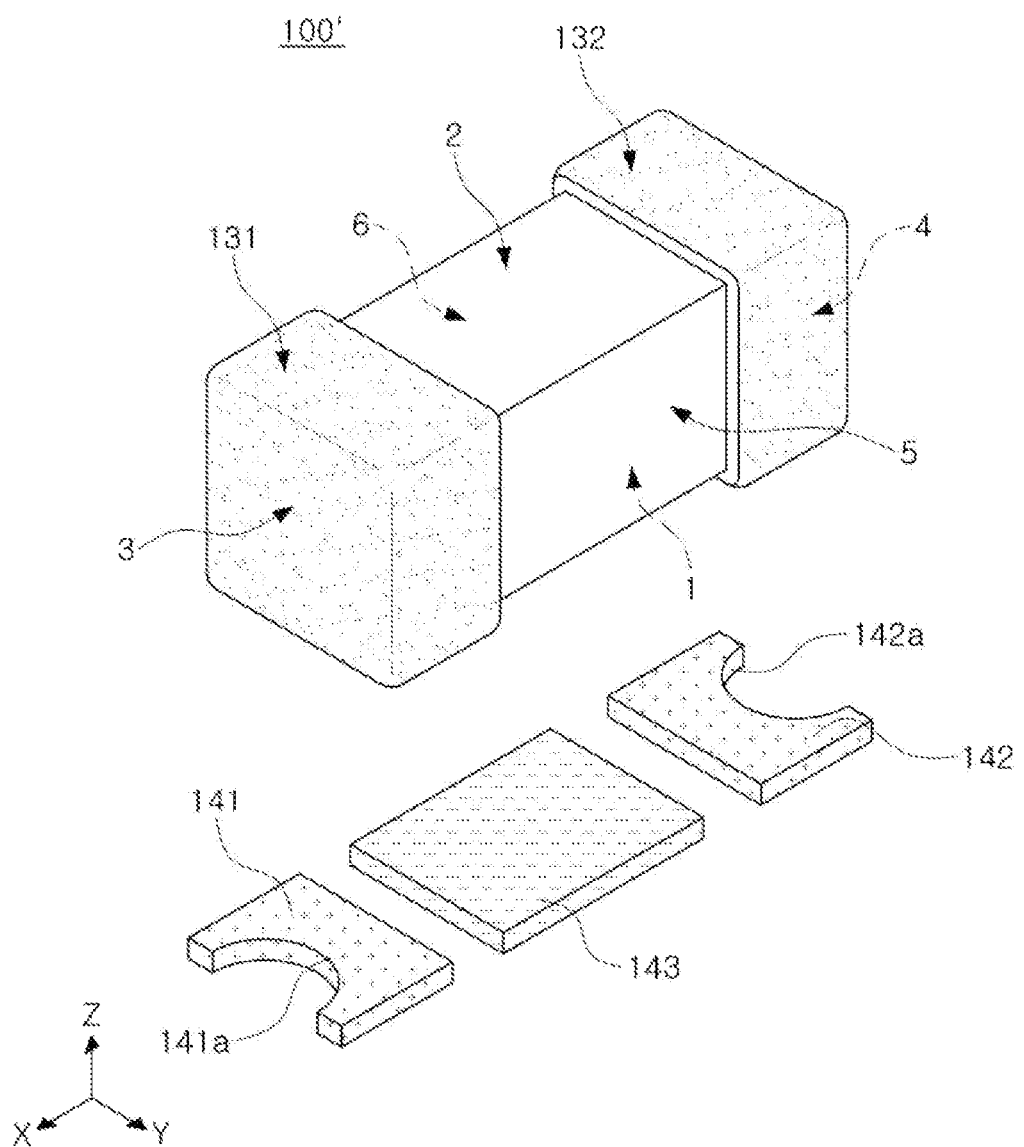
FIG. 8 is an exploded perspective view illustrating a connection terminal separated from FIG. 7.
Figure 9:
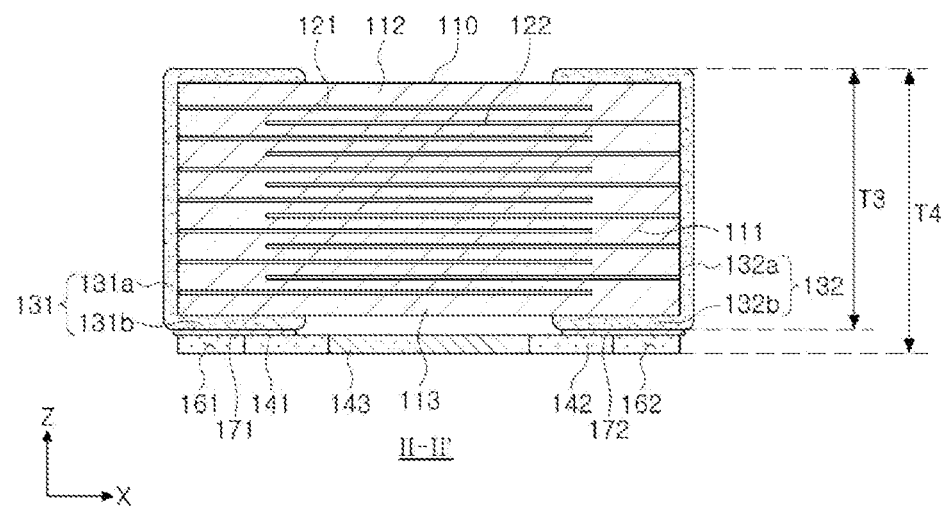
FIG. 9 is a cross-sectional view taken along line II-II' of FIG. 7.

FIG. 7 is a perspective view illustrating a multilayer electronic component according to another embodiment, FIG. 8 is an exploded perspective view illustrating a connection terminal separated from FIG. 7, and FIG. 9 is a cross-sectional view taken along line II-II' of FIG. 7.

In this case, details similar to those in the above-described embodiment are omitted to avoid duplication.

Referring to FIGS. 7 to 9, illustrating a multilayer electronic component 100' according to another embodiment, a connection terminal 140' may be comprised of an interposer.

In this case, in the case of the interposer, it may be difficult to form cutouts in first and second land portions 141 and 142 due to processing difficulties. In this case, the thickness of the connection terminal 140' may be adjusted to have an increased thickness, such that a height of a solder fillet formed in the multilayer capacitor may be reduced, thereby improving an effect of reducing acoustic noise.

In this embodiment, a bridge portion 143 may be disposed between the first and second land portions 141 and 142 adjacent to each other in the connection terminal 140'.

The bridge portion 143 is formed of an insulator as a non-conductive material, and is disposed between the first and second land portions 141 and 142 in the X direction.

For example, the bridge unit 143 may be formed of an insulating substrate or a circuit board such as a FR4 substrate, F-PCB or the like, but an embodiment thereof is not limited thereto.

The bridge portion 143 is provided with the first and second land portions 141 and 142 positioned on both ends thereof, thereby easily matching the positions to which the first and second land portions 141 and 142 are attached when the connection terminal 140' is attached to first and second external electrodes 131 and 132.

In this case, when the first and second land portions 141 and 142 and the bridge portion 143 are formed of the same material, the first and second land portions 141 and 142 and the bridge portion 143 may be integrally formed.

The first and second land portions 141 and 142 and the bridge portion 143 may all be formed of a ceramic material as a non-conductive material, for example, be formed of alumina, but an embodiment thereof is not limited thereto.

In the connection terminal 140' of this embodiment, the first and second land portions 141 and 142 may be formed of a conductor.

In this case, the connection terminal 140' may be configured in such a manner that the bridge portion 143 is separated from the first and second land portions 141 and 142.

In the multilayer electronic component 100' of this embodiment, when the thickness of the multilayer capacitor is T3, and a distance from the top of the first or second external electrode 131 or 132 to the bottom of the connection terminal 140' is T4, T3/T4 may be 0.6 to 0.9.

In a case in which the thickness of the multilayer capacitor is formed to be relatively thick, if T3/T4 is less than 0.6, a thickness of the connection terminal 140' becomes too thick, causing the connection terminal itself to vibrate by shaking, thereby vibrating a solder fillet.

As a result, since the connection terminal 140' causes occurrence of acoustic noise, the connection terminal 140' may not serve as a noise reduction structure.

On the contrary, in a case in which the thickness of the multilayer capacitor is formed to be relatively thin, if T3/T4 is less than 0.6, a maximum displacement amount generation portion of the multilayer capacitor and a solder fillet are easily in contact with each other even in a case in which the solder fillet is low. Thus, maximum displacement is transferred to the substrate, and acoustic noise increases.

If T3/T4 exceeds 0.9, the connection terminal 140' is formed to have relatively too thin thickness, and formation of the solder fillet to the head surfaces of a multilayer capacitor may not be appropriately suppressed.

Accordingly, vibrations transferred from the multilayer capacitor to the substrate increase, and as a result, the connection terminal 140' may not serve as a noise reduction structure.

Therefore, by limiting the range of T3/T4 to 0.6 to 0.9, an acoustic noise reduction effect of the multilayer electronic component 100' in this embodiment may be obtained.

Figure 10:
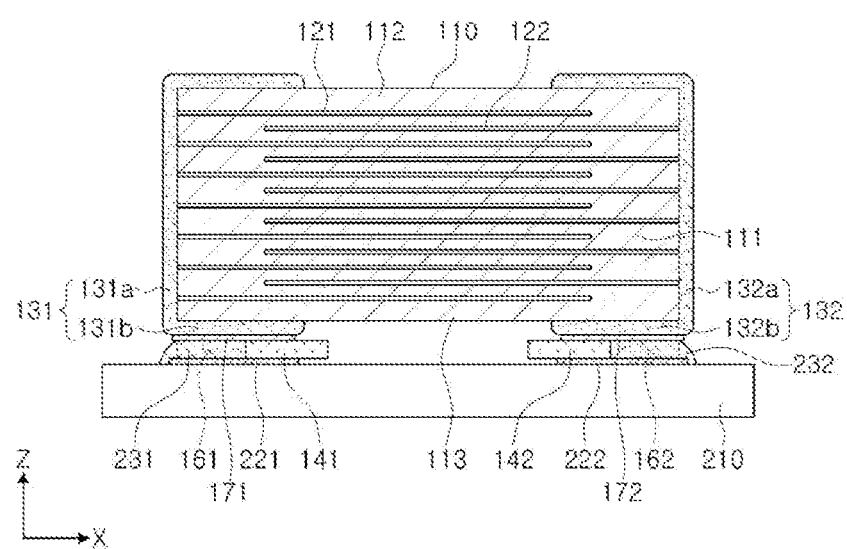
FIG. 10 is a cross-sectional view schematically illustrating a state in which a multilayer electronic component according to an embodiment of the present disclosure is mounted on a substrate.

Referring to FIG. 10, a board having a multilayer electronic component mounted thereon according to the embodiment may include a substrate 210 on which first and second electrode pads 221 and 222 are formed on one surface thereof, and a multilayer electronic component mounted above the substrate 210, in such a manner that first and second land portions 141 and 142 are disposed on the first and second electrode pads 221 and 222 to be connected thereto, respectively.

In this embodiment, although the multilayer electronic component is illustrated and described as being mounted on the substrate 210 by solders 231 and 232, a conductive paste may be used instead of solder as required.

If voltages having different polarities are applied to the first and second external electrodes formed on the multilayer capacitor in a state in which the multilayer capacitor is mounted on the substrate, the capacitor body expands and contracts in the Z direction by the inverse piezoelectric effect of a dielectric layer, and both ends of the first and second external electrodes are contracted and expanded in the opposite direction to the expansion and contraction of the capacitor body in the Z direction by the Poisson effect.

This contraction and expansion causes vibrations. The vibration is transferred to the substrate from the first and second external electrodes, and thus, the sound is radiated from the substrate to become acoustic noise.

If the multilayer capacitor is directly mounted on the substrate without the connection terminal, the solder formed between the first and second external electrodes and the first and second electrode pads formed on one surface of the substrate is formed to have a predetermined height toward the second surface of the capacitor body, such that a relatively large amount of vibrations occurring from the multilayer capacitor may be transferred to the substrate.

According to this embodiment in the present disclosure, piezoelectric vibration transferred to the substrate through the first and second external electrodes 131 and 132 of the multilayer electronic component 100 is absorbed through elasticity of the first and second land portions 141 and 142 formed of an insulator that is formed of a soft material, thereby reducing acoustic noise.

In this case, the first and second solder accommodating portions 161 and 162 provided by the first and second cutouts 141a and 142a of the first and second land portions 141 and 142, respectively, serve as solder pockets to trap solders 231 and 232.

Therefore, the solders 231 and 232 are effectively confined in the first and second solder accommodating portions 161 and 162, thereby reducing the height of the solder fillet toward the second surface of the capacitor body 110.

Therefore, a piezoelectric vibration transmission path of the multilayer electronic component 100 may be blocked, and a maximum displacement point in the solder fillet and the capacitor body 110 is separated, thereby significantly reducing acoustic noise as compared to the case in which a multilayer capacitor is directly mounted on a substrate without a connection terminal.

Further, according to the structure of the multilayer electronic component of this embodiment as described above, the acoustic noise reduction structure may effectively suppresses the amount of vibration that piezoelectric vibration of the multilayer electronic component is transmitted to the substrate at an audible frequency within 20 kHz of the multilayer electronic component.

Therefore, by reducing high frequency vibrations of the multilayer electronic component to prevent malfunction of sensors that may be a problem by high frequency vibrations of 20 kHz or more of the electronic component in the IT or industrial/electric field, internal fatigue accumulation by the long time vibration of sensors may be suppressed.

As set forth above, according to an embodiment, there is an effect in which acoustic noise in an audible frequency region of less than 20 kHz and high frequency vibrations of 20 kHz or more of a multilayer electronic component may be reduced.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multilayer electronic component comprising:
a multilayer capacitor including a capacitor body and a plurality of external electrodes spaced apart from each other on a mounting surface of the capacitor body; and
a connection terminal including land portions disposed on the plurality of external electrodes, respectively,
wherein T1/T2 is 0.6 to 0.9, in which T1 is a thickness of the multilayer capacitor and T2 is a distance from an uppermost end of the plurality of external electrodes to a bottom of one of the land portions,
wherein the connection terminal further comprises a bridge portion disposed between the land portions such that one of the land portions is disposed on one surface of the bridge portion and another of the land portions disposed on another surface of the bridge portion opposite to the one surface, and
wherein the bridge portion is made of a non-conductive material and the land portions are made of a conductive material such that the bridge portion and the land portions are distinguished from each other.

2. The multilayer electronic component of claim 1, wherein the capacitor body has a first surface which is the mounting surface, and a second surface opposing the first surface, and third and fourth surfaces connected to the first and second surfaces and opposing each other, and fifth and sixth surfaces connected to the first and second surfaces and connected to the third and fourth surfaces, the fifth and sixth surfaces opposing each other, and the capacitor body comprises a first internal electrode and a second internal electrode, one ends of the first and second internal electrodes alternately extending from the third and fourth surfaces;
the plurality of external electrodes comprise a first external electrode and a second external electrode, the first and second external electrodes including first and second band portions disposed on the first surface to be spaced apart from each other and first and second connection portions extending from the first and second band portions onto the third and fourth surfaces, respectively, and connected to the first and second internal electrodes, respectively; and
the land portions comprise first and second land portions, disposed on the first and second band portions, respectively, the first and second land portions being provided with first and second cutouts provided in two surfaces of the first and second land portions, facing each other in a direction connecting the third and fourth surfaces, respectively.

3. The multilayer electronic component of claim 2, wherein the first and second internal electrodes are alternately stacked in a direction connecting the first and second surfaces of the capacitor body.

4. The multilayer electronic component of claim 2, wherein the first and second internal electrodes are alternately stacked in a direction connecting the fifth and sixth surfaces of the capacitor body.

5. The multilayer electronic component of claim 2, wherein the first and second band portions are provided with first and second solder accommodating portions which are provided on lower sides of the first and second band portions by the first and second cutouts, respectively.

6. The multilayer electronic component of claim 1, wherein the connection terminal is an interposer.

7. The multilayer electronic component of claim 1, wherein the land portions and the bridge portion are in contact with each other.

8. The multilayer electronic component of claim 1, wherein the bridge portion and the land portions are spaced apart from each other.

9. The multilayer electronic component of claim 1, wherein the bridge portion is made of alumina.

10. The multilayer electronic component of claim 1, further comprising conductive adhesives disposed between the land portions and the plurality of external electrodes, respectively.

11. A board having a multilayer electronic component mounted thereon, the board comprising:
- a substrate on which a plurality of electrode pads are disposed; and
- the multilayer electronic component of claim 1, mounted in such a manner that the land portions are mounted on the plurality of electrode pads to be connected to the plurality of electrode pads, in a one to one manner.

12. The multilayer electronic component of claim 1, wherein there is no separate conductor layer on the land portions.

13. The multilayer electronic component of claim 1, wherein the conductive material is an only material included in the land portions.

14. A multilayer electronic component comprising:
- a multilayer capacitor including a capacitor body and a plurality of external electrodes spaced apart from each other on a mounting surface of the capacitor body; and
- a connection terminal including land portions disposed on the plurality of external electrodes, respectively,
- wherein T1/T2 is 0.6 to 0.9, in which T1 is a thickness of the multilayer capacitor and T2 is a distance from an uppermost end of the plurality of external electrodes to a bottom of the connection terminal, and
- wherein the connection terminal further comprises a bridge portion disposed between the land portions to be spaced apart from each of the land portions.

15. The multilayer electronic component of claim 14, wherein the capacitor body has a first surface which is the mounting surface, and a second surface opposing the first surface, and third and fourth surfaces connected to the first and second surfaces and opposing each other, and fifth and sixth surfaces connected to the first and second surfaces and connected to the third and fourth surfaces, the fifth and sixth surfaces opposing each other, and the capacitor body comprises a first internal electrode and a second internal electrode, one ends of the first and second internal electrodes alternately extending from the third and fourth surfaces;
- the plurality of external electrodes comprise a first external electrode and a second external electrode, the first and second external electrodes including first and second band portions disposed on the first surface to be spaced apart from each other and first and second connection portions extending from the first and second band portions onto the third and fourth surfaces, respectively, and connected to the first and second internal electrodes, respectively; and
- the land portions comprise first and second land portions, disposed on the first and second band portions, respectively, the first and second land portions being provided with first and second cutouts provided in two surfaces of the first and second land portions, facing each other in a direction connecting the third and fourth surfaces, respectively.

16. The multilayer electronic component of claim 15, wherein the first and second band portions are provided with first and second solder accommodating portions which are provided on lower sides of the first and second band portions by the first and second cutouts, respectively.

17. The multilayer electronic component of claim 14, wherein the land portions are comprised of a conductor.

18. The multilayer electronic component of claim 14, further comprising conductive adhesives disposed between the land portions and the plurality of external electrodes, respectively.

19. A board having a multilayer electronic component mounted thereon, the board comprising:
- a substrate on which a plurality of electrode pads are disposed; and
- the multilayer electronic component of claim 14, mounted in such a manner that the land portions are mounted on the plurality of electrode pads to be connected to the plurality of electrode pads, in a one to one manner.

* * * * *